Figure 1:
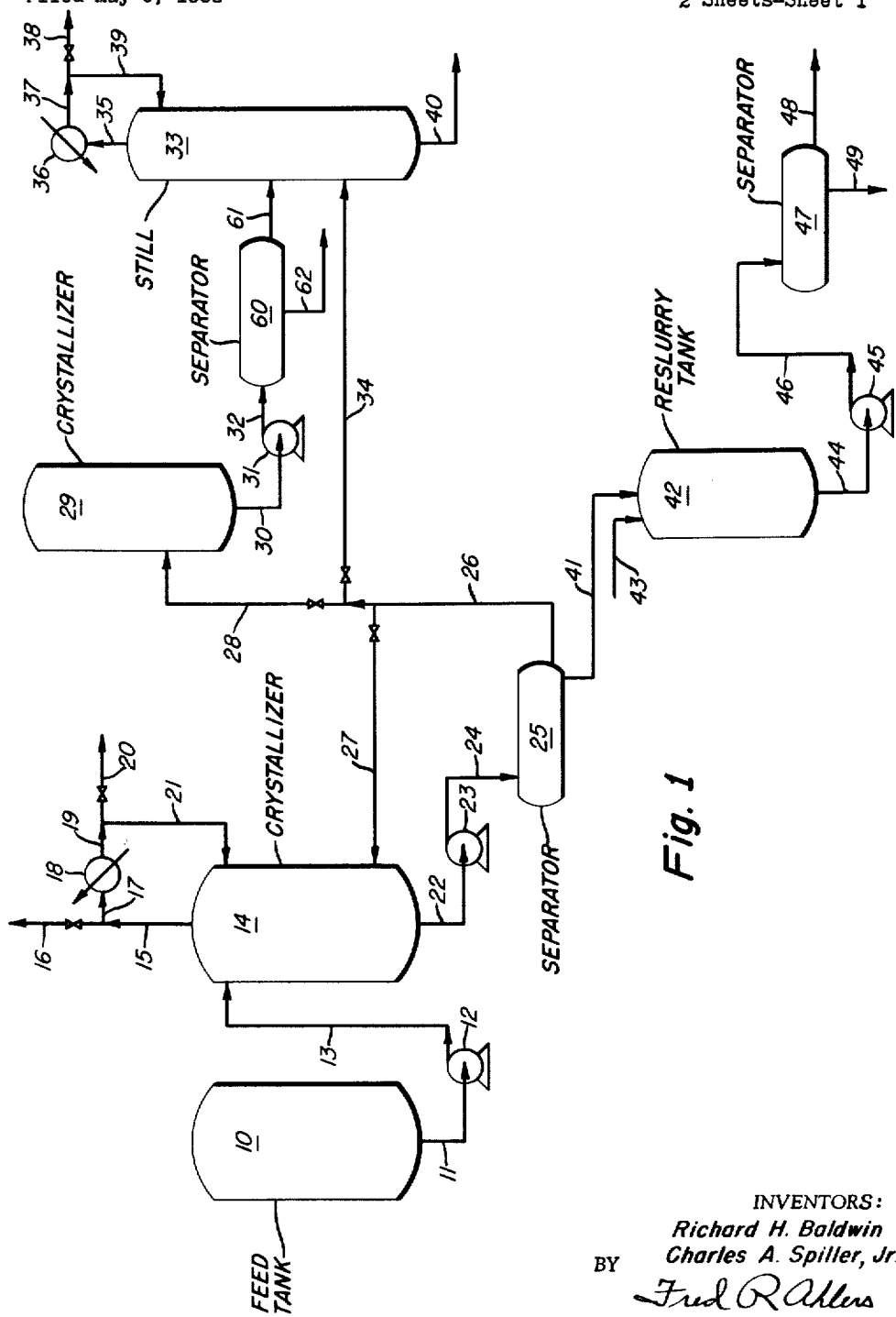

March 19, 1963

R. H. BALDWIN ET AL 3,082,250

RECOVERY OF PHTHALIC ACID PRODUCTS

Filed May 5, 1958

2 Sheets-Sheet 1

INVENTORS:
Richard H. Baldwin
Charles A. Spiller, Jr.
BY
Fred R Ahlers
ATTORNEY

INVENTORS:
Richard H. Baldwin
Charles A. Spiller, Jr.
BY Fred R Ahlers
ATTORNEY

3,082,250
RECOVERY OF PHTHALIC ACID PRODUCTS
Richard H. Baldwin, Chicago, and Charles A. Spiller, Jr., Joliet, Ill., assignors to Standard Oil Company, Chicago, Ill., a corporation of Indiana
Filed May 5, 1958, Ser. No. 733,183
7 Claims. (Cl. 260—524)

This invention relates to the preparation of phthalic acids and more specifically pertains to the separation and recovery of phthalic acid products from mixtures of phthalic acids resulting from the oxidation of phthalic acid precursors, and also pertains to the separation of individual isomeric phthalic acid products from mixtures of the phthalic acid isomers obtained by the catalytic liquid phase oxidation of a mixture of phthalic acid precursors with molecular oxygen in the presence of a saturated aliphatic monocarboxylic acid reaction solvent.

Ortho-phthalic acid in the form of phthalic anhydride has been long used in the preparation of plasticizers and in the manufacture of synthetic resins such as polyester resins and alkyd resins. More recently, isophthalic acid and terephthalic acid have become available as commercial products in a purity which is satisfactory for the preparation of polyester resins. Also, terephthalic acid of high purity has provided new textile fibers through the polymeric glycol terephthalates. All of the phthalic acid isomers, therefore, have become of commercial importance and it is highly desirable to produce these phthalic acid isomers by a process which is readily adaptable to industrial practices.

A number of processes have been proposed for the preparation of phthalic acids. However, since most of the proposed processes are not capable of producing all of the isomeric phthalic acids, but rather are applicable to only a single isomeric phthalic acid, such proposed processes will, of course, require the use of a substantially pure starting material. It is well known that the most desirable of the precursors for the isomeric phthalic acids are the isomeric xylenes which may be separated into substantially pure isomers only by involved processes. Also, it is well known that it is even more difficult to separate individual isomeric phthalic acids from a mixture containing all three isomeric phthalic acids. A nitric acid oxidation of mixed xylenes in the presence of a fluidizing diluent has been suggested. However, until recently, no process has been available for the simultaneous liquid phase catalytic oxidation of all three isomeric xylenes to the corresponding isomeric phthalic acids. But no process for separating the mixed phthalic acid products has been available. For this reason the simultaneous preparation of the isomeric phthalic acids has not been considered commercially feasible.

However, with the discovery of a commercially acceptable liquid phase oxidation process by which not only individual isomeric phthalic acids but all three isomeric phthalic acids can be simultaneously prepared by carrying out the oxidation process in the presence of a catalyst comprising in conjoint presence bromine and a metal oxidation catalyst, it has become important and desirable to be able to recover individual isomeric phthalic acid products from mixtures thereof. It is also of importance that such a separation process provide the individual isomeric phthalic acid products of sufficient purity to be useful at least in making synthetic resins such as the polyester resins. It is also desirable that such a process produce a terephthalic acid product which can be conveniently obtained which can be readily converted to the purity required for the preparation of the polyglycol terephthalate fibers.

A successful commercial application of the newly discovered liquid phase catalytic oxidation of precursors of isomeric phthalic acids; e.g. a mixture of the isomeric aromatic compounds containing at least one aliphatic substituent attached to a benzenoid ring which is oxidizable to a carboxyl group directly attached to said ring, especially dialkyl benzenes; with molecular oxygen in the presence of a catalyst comprising in conjoint presence of a metal oxidation catalyst and bromine is partially dependent upon a process for successfully separating a terephthalic acid product, an isophthalic acid product, an ortho-phthalic acid product or its anhydride each of at least sufficient purity for the preparation of synthetic resins other than the fiber forming resins. The success of such a separation process will permit the use of mixtures of said oxidizable aromatic compounds, and specifically isomeric xylenes which are the most readily available commercial products as oxidizable feed stocks or permit the use as oxidizable feeds mixtures of toluic acids, cumic acids and the like which may be obtained from said mixtures of dialkylbenzenes from oxidation systems which do not employ the catalyst system comprising in conjoint presence a metal oxidation catalyst and bromine.

It is an object of this invention, therefore, to provide a process and means for separating from mixtures of isomeric phthalic acids obtained by any process individual isomeric phthalic acid products especially of a purity of at least sufficient for use in the preparation of synthetic resins other than fiber forming polymers.

It is a further object of this invention, therefore, to provide a process and means for separating from mixtures of isomeric phthalic acids obtained by the catalytic liquid phase oxidation of phthalic acid precursors with molecular oxygen in the presence of a catalyst comprising in conjoint presence bromine and a metal oxidation catalyst in the presence of a saturated aliphatic monocarboxylic acid containing 2 to 8 carbon atoms as the reaction medium, individual phthalic acid products of a purity at least sufficient for use in the preparation of synthetic resins other than fiber forming polymers. Other objects of the process of this invention will be apparent from a detailed description of the process of this invention.

This invention comprises crystallizing from a mixture containing isomeric phthalic acids and a saturated aliphatic monocarboxylic acid containing 2 to 8 carbon atoms wherein said mixture substantially all of the isophthalic acid is dissolved, a solid phthalic acid product containing a portion of ortho-phthalic acid, separating this solid phthalic acid product from the mother liquor containing the remainder of the orthophthalic acid dissolved therein, and dissolving the ortho-phthalic acid from the solid phthalic acid product leaving a second phthalic acid product. Ortho-phthalic acid is recovered from the solutions thereof. Terephthalic acid and isophthalic acid are recovered from the second solid phthalic acid product. This invention also contemplates the recovery of the aliphatic monocarboxylic acid and any benzoic acid in the mixture of phthalic acids. This invention also includes crystallizing from the mixture containing phthalic acids and aliphatic monocarboxylic acid to obtain a gross solid phthalic acid product containing a major portion, up to about 80%, of ortho-phthalic acid with the remainder being dissolved in the mother liquor. Then ortho-phthalic acid is separated from the solid gross phthalic acid product leaving a second solid phthalic acid product from which terephthalic acid and isophthalic acid are recovered. Ortho-phthalic acid is recovered as its anhydride and, if present, benzoic acid is recovered. The process of this invention, therefore, comprises crystallizing from a mixture containing the three isomeric phthalic acids and a reaction medium comprising monocarboxylic acid containing 2 to 8 carbon atoms a solid gross phthalic acid product containing terephthalic acid, isophthalic acid and a major proportion of orthophthalic acid, separating the solid gross phthalic acid product from the mother liquor, separately recovering each of the isomeric phthalic acids from said gross phthalic acid product of a quality of at least 90%, recovering aromatic acids from said mother liquor and recovering the monocarboxylic acid reaction medium.

The process of this invention can be carried out employing oxidation reaction mixtures wherein acetic acid, propionic acids, butyric acids, valeric acid, pentanoic acids, caproic acid, heptanoic acids, octanoic acids, cyclohexane carboxylic acid and benzoic acid or mixtures thereof have been used as the reaction medium. Since acetic acid is the most readily available of these saturated aliphatic monocarboxylic acids, and since the use of acetic acid provides in the oxidation system certain technical advantages such as its superior resistance to oxidation and its lower boiling point, it is preferred, therefore, to carry out the process of this invention with reaction mixtures wherein aceitc acid is the reaction-medium. However, it will be understood by those skilled in the art that the same procedural steps modified only by taking into account the known differences between acetic acid and its higher homologues will be required when the other saturated aliphatic monocarboxylic acids are employed as reaction medium. For example, higher or lower crystallization temperatures will be required when using saturated aliphatic monocarboxylic acids other than acetic acid, depending, of course, on the solubility of the isomeric phthalic acids in these lower aliphatic acid solvents. Also, the precise temperatures at which the reaction medium acid is recovered and separated from ortho-phthalic acid by one modification of the process of this invention will, of course, depend upon the physical properties of the monocarboxylic acid employed as the reaction medium.

The process of this invention can also be employed to separately recover individual isomeric phthalic acids from mixtures thereof obtained from other oxidation procecces. For example there is disclosed in U.S. Patent No. 2,766,281 the oxidation of mixed xylenes with nitric acid at atmospheric pressure in the presence of such inert organic materials as chlorinated biphenyls, mineral oil, benzoic acid. Such an oxidation process will, of course, result in the formation of mixtures of the isomeric phthalic acids. Also the liquid phase oxidation of xylenes and other dialkylbenzenes in the presence of bromine and heavy metal oxidation catalyst can be carried out in the presence of inert reaction mediums other than acids of the acetic acid series. For example when either oxidation process is carried out using benzoic acid as the reaction medium the resulting mixture containing the isomeric phthalic acids and benzoic acid including benzoic acid formed by the oxidation of monoalkyl benzene present in the feed stock. The mixture of aromatic compounds can be heated with acetic acid or other members of the acetic acid series containing up to 8 carbon atoms in an amount sufficient to dissolve at least all of the isophthalic acid. Since ortho-phthalic acid and benzoic acid are more soluble than isophthalic acid these acids will also be dissolved. In addition a small amount of terephthalic acid will be dissolved. By the process of this invention the aromatic acid products can be separated and recovered. As an alternate means for separation the terephthalic acid remaining undissolved can be first separated from the solution as a product of excellent quality. The solid phthalic acid product obtained by crystallization of the solution so prepared will have less terephthalic acid than would otherwise be present but would contain all of the isophthalic acid and a portion of the ortho-phthalic acid. The subsequent separations and recovery steps will be the same as hereinbefore described.

The process of this invention is not dependent upon the precise phthalic acid precursors employed, although for practical purposes the phthalic acid precursors will be mixtures of isomeric xylenes. However, oxidizable dialkyl benzene mixtures containing the isomeric precursors of the isomeric phthalic acids can also be used as a raw material. Also, partial oxidation products of the dialkyl benzenes can be employed as starting materials in the oxidation process which will provide mixtures of the isomeric phthalic acids. For example, a mixture of isomeric toluic acids obtained by a liquid phase oxidation with molecular oxygen of a mixed xylene feed stock by a process which can be stopped at the production of toluic acids may provide the toluic acid mixture which can be used as a starting material to provide a mixture containing the isomeric phthalic acids. Also, such intermediate oxidative derivatives of dialkylbenzenes as those containing alcohol, aldehyde, ketone, peroxide and ether groups may be used as a starting material for the liquid phase oxidation in the presence of a catalyst comprising in conjoint presence bromine and a metal oxidation catalyst and in the presence of the monocarboxylic acid to provide the reaction mixture containing the isomeric phthalic acids. Such an oxidation process is more fully described in copending application Serial No. 530,401 filed August 24, 1955 now U.S. Patent No. 2,833,816.

Regardless of the starting material employed as a feed stock precursor for the isomeric phthalic acids, the reaction mixture withdrawn from the oxidation reactor is hot, being at a temperature above about 140° F. and generally at a temperature above 250° F. up to 525° F. Such a reaction mixture in addition to the isomeric phthalic acids, the catalyst and the monocarboxylic reaction medium may contain such other oxidation products as benzoic acid (which is formed by the oxidation of monoalkyl benzene in addition to that added as the reaction medium), toluic acid, as well as other non-acid by-products. The process of this invention relates to the separation and recovery of the phthalic acid products, the reaction medium and the other aromatic acids which may be present in such reaction mixtures.

More specifically, the process of this invention starts with a mixture of phthalic acids obtained from an oxidation process wherein a mixed xylene feed stock has been oxidized. The mixed phthalic acids, which also may contain benzoic and toluic acids, are provided for the procedural steps of the process of this invention in admixture with acetic acid, 60 to 100% with the remainder being water. This acetic acid mixture as hereinbefore pointed out, can be formed as a result of catalytic liquid phase oxidation of phthalic acid precursors with molecular oxygen or by combining acetic acid with a mixture of phthalic acids recovered from nitric acid oxidation and heating to a temperature above 140° F., up to about 350° F. being sufficient to dissolve at least a major portion of the isophthalic acid. The amount of acetic acid initially present can vary from 30 parts by weight to 500 or more parts by weight calculated as 100% acetic acid per 100 parts by weight of total mixture. The more diluted mixtures, i.e. containing more than 50 parts by weight up to 500 parts by weight of acetic acid (100% per 100 parts by weight of total mixture) are preferably concentrated to mixtures containing 30 to 50 parts by weight acetic acid (100%) per 100 parts by weight of total mixture. This can be accomplished by distilling off acetic acid and/or by evaporative cooling.

With respect to the accompanying diagrammatic flow sheet drawings which are incorporated herein and are made a part hereof in FIG. 1 a composition containing the isomeric phthalic acids and acetic acid with a substantial portion of the isophthalic acid in solution is provided in feed tank 10. The acetic acid composition containing the isomeric phthalic acids is withdrawn from feed tank 10 through conduit 11 by pump 12 and charged to crystallization tank 14 through conduit 13. The acetic acid composition containing the phthalic acids may be concentrated by removing acetic acid vapors from conduit 15 through valved conduit 16 or by removing condensate through valved conduit 20. The slurry in tank 14 can be cooled by evaporative cooling by taking vapors from conduit 15 through conduit 17 to condenser 18 and part or all of the condensate taken from conduit 19 by conduit 21 and returned to crystallization tank 14. It is preferred to cool the mixture of the phthalic acids and acetic acid in tank 14 to a temperature at which all of the isophthalic acid and a portion of the orthophthalic acid, 25% or more and preferably up to 70 to 80% of the ortho-acid, crystallizes from solution. Crystallization temperatures of from 120° F. to 160° F. are satisfactory with crystallization temperatures of 130 to 150° F. being preferred. The cooled slurry is withdrawn from tank 14 through conduit 22 by slurry pump 23 and charged through conduit 24 to separator 25 which may be a filter press, centrifugal filter or decanter, cyclone separator and the like to separate and recover the crystallized product from the mother liquor.

The mother liquor containing the remainder of the ortho-phthalic acid and any benzoic acid and toluic acid present in the mixture of isomeric phthalic acids is taken from separator 25 through conduit 26. A portion of the mother liquor may be recycled to crystallization tank 14 through valved conduit 27. The ortho-phthalic acid in the mother liquor may be recovered by charging through valved conduit 28 to crystallizer 29 where a crystalline ortho-phthalic acid product is formed. The resulting slurry is taken through conduit 30 by pump 31 and charged through conduit 32 to separator 60, which may be the same as separator 25, to separate and recover the crystalline ortho acid product from the second mother liquor with the second mother liquor being withdrawn through conduit 62 to acetic acid recovery or a portion thereof recycled to tanks 10, 14, or 29 and the remainder fed to acetic acid recovery. The crystalline ortho acid product is recovered and charged to still 33 through conduit 61 where the ortho acid is recovered as phthalic anhydride and benzoic and toluic acids are separated by distillation. Alternatively, the mother liquor from separator 25 can be charged through valved conduits 26 and 34 to still 33 where an acetic acid product, a benzoic acid product, a toluic acid product and a phthalic anhydride product may be recovered by fractionation. Still 33 being provided with vapor line 35, condenser 36, condensate line 37, reflux line 39, product withdrawal line 38, and bottoms discharge line 40. Bottoms withdrawn from still 33 through conduit 40 containing recoverable products such as some benzoic acid, phthalic anhydride, toluic acid and metals from the oxidation catalyst, if present, may be further processed to recover the metals and the aromatic acids or may be discarded or may be recycled for example to tank 10.

The solid phthalic acid product recovered in separator 25 is withdrawn through conduit 41 and charged to reslurry tank 42 together with a solvent such as water, recovered or fresh acetic acid, or recycled aqueous mother liquors. Other solvents can be employed but water, aqueous mother liquors, acetic acid and acetic acid mother liquors are most satisfactory with the aqueous solvents, i.e. water or recycled aqueous mother liquors preferred. In reslurry tank 42 all the orthophthalic acid is dissolved from the mixture of phthalic acids. The solvent is charged through conduit 43. The resulting slurry is agitated and heated if necessary to accomplish the leaching or extraction of the ortho acid. The resulting slurry is then taken through conduit 44 by slurry pump 45 and charged through conduit 46 to separator 47 which also may be of the types of apparatus used as separators 25 and 60. The mother liquor from separator 47 is discharged through conduit 48 and ortho-phthalic acid may be recovered therefrom, for example by crystallization and purified by dehydration to the anhydride and distilling the anhydride. The mother liquor from the recovery of the ortho acid by crystallization can be recycled to reslurry tank 42.

The solid recovered by separator 47 contains only isophthalic acid and terephthalic acid and is withdrawn through conduit 49 and charged to a process for recovering an isophthalic acid product and a terephthalic acid product. A terephthalic acid product of high purity, at least 98% can be obtained by leaching isophthalic acid from the mixture with a selective solvent such as water at a temperature above 210° F., sulfuric acid (70% $H_2SO_4$), dimethyl formamide, or methanol according to processes well known to the art. The isophthalic acid product recovered from the solution formed by this leaching process will contain 85 to 90% isophthalic acid and 10 to 15% terephthalic acid. The mixture of isophthalic acid and terephthalic acid can also be separated by forming such salts as barium and ammonium salts of the mixed acids and separating the resulting mixed salts, and springing the individual phthalic acid products with mineral acid.

Figure 2:
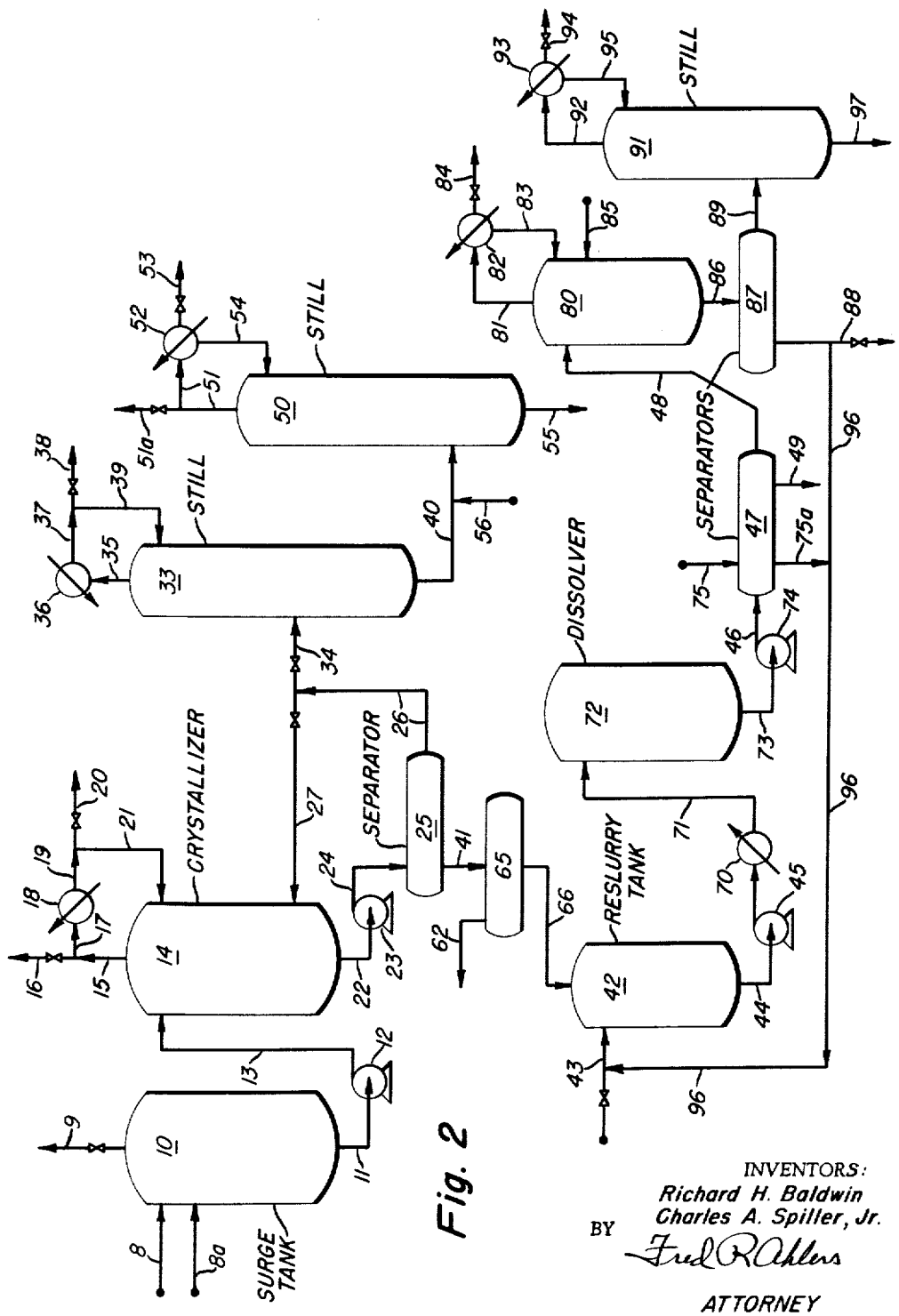

With respect to FIG. 2, the same aparatus used for the same purposes in the procedural steps of the process illustrated by FIG. 1, are given the same numerical characteristics. The process illustrated by FIG. 2 is a modification of that of FIG. 1 and is adapted for use in a continuous process where solvent vapor streams are recovered, mother liquors are recycled and additional steps of heating and/or holding are provided. For example, drier 65 receives the wet solids from separator 25 so that acetic acid can be removed for recovery. A second distillation apparatus 50 is employed for fractionation of aromatic acids after wet acetic acid is distilled off in still 33 from the mother liquor from separator 25. Dissolver 72 and heat-exchanger 70 are interposed between reslurry tank 42 and separator 47. Wash line 75 and wash drain line 75a are provided to wash the solids recovered in separator 47 and to provide for recycle of wash liquor to reslurry tank 42. An orthophthalic acid crystallizer 80 is provided with means for concentration and evaporative cooling of the ortho acid solution. A separator 87 is provided for recovery of crystallized ortho acid and distillation apparatus 91 with condenser, reflux line, product withdrawal line and discharge line are provided for recovery of the ortho acid as purified phthalic anhydride. The process as illustrated by FIG. 2, in general, is conducted as described in connection with FIG. 1. A more detailed description of the process illustrated by FIG. 2 is given in Example 2.

The following illustrative example describes a specific embodiment of the process of this invention in detail, employing the process described with respect to FIG. 1.

*Example 1*

A reaction mixture containing ortho-phthalic acid, isophthalic acid, terephthalic acid, benzoic acid, toluic acid, acetic acid, catalyst and non-organic reaction by-products such as may be obtained by the catalytic liquid phase oxidation with air of 8,000 parts by weight of a xylene mixture containing 23.6% by weight ortho-xylene, 45.4% by weight meta-xylene, 18% by weight para-xylene and the remaining 13.0% by weight being toluene and ethylbenzene in a reaction medium comprising 12,000 parts by weight of acetic acid and in the presence of a catalyst comprising in conjoint presence bromine and a metal oxidation catalyst at 380° to 425° F. This reaction mixture is cooled in the reactor to about 350° F. and may be discharged into feed tank 10 or discharged directly into crystallizing tank 14 where it is cooled to 140° F. and then filtered to recover the gross phthalic acid product. The filter cake is washed with hot acetic acid, about 100° F., and dried. The acetic acid wash liquor combined with the mother liquor. The solids recovered when dried contain about 15% by weight ortho-phthalic acid, 55% by weight isophthalic acid and 30% by weight terephthalic acid. The mother liquor is combined with the acetic acid used for washing and the composite is about 27,500 parts by weight. This composite solution is distilled at atmospheric pressure to first recover wet acetic acid. The solid residue remaining in the still, about 2,891 parts by weight, contains aromatic acids, catalyst and coke or tar-like materials. The aromatic portion of the residue comprises 34.6% by weight benzoic acid, 2.4% by weight toluic acid, 52.5% by weight ortho-phthalic acid, 8.0% by weight isophthalic acid and 2.5% by weight terephthalic acid. This residue is further distilled at 400 mm. Hg. The ortho-phthalic acid first dehydrates and after the water of dehydration is removed there is distilled off benzoic acid, toluic acid and phthalic anhydride.

The wet acetic acid recovered from the first distillation is readily fractionated to a 95% acetic acid fraction suitable for recycling to the oxidation reaction process or use in the washing of the phthalic acid product and then added to the oxidation reaction as the reaction medium.

The isomeric phthalic acids can be recovered from the gross phthalic acid product by slurrying this product, before or after drying, with from about 1.5 parts by weight of water per part by weight of the gross phthalic acid product at 200°–210° F. to dissolve the ortho-phthalic acid. The resulting aqueous solution is cooled to about 120° to 130° F. to crystallize about 75–80% of the ortho-phthalic acid which can be recovered by filtration. The ortho-phthalic acid remaining in solution can be recovered by concentrating this aqueous mother liquor and again crystallizing ortho-phthalic acid therefrom or by distilling off the water, dehydrating ortho-phthalic acid and recovering phthalic anhydride by distillation. Also the gross phthalic acid product can be heated to about 200–210° C. to dehydrate the ortho-phthalic acid and the resulting mixture extracted with benzene which dissolves the phthalic anhydride leaving the isophthalic acid and terephthalic acid as the undissolved solid residue.

The mixture of isophthalic acid and terephthalic acid remaining from either of the above steps of removing ortho-phthalic acid from the gross product, can be separated by using such selective solvents as acetic acid, concentrated sulfuric acid (70% $H_2SO_4$) or methanol according to processes well known to art. Also separation of these two phthalic acid isomers can be accomplished by reacting with barium carbonate in water, the barium isophthalate dissolving and the barium terephthalate remaining undissolved, filtering the resulting mixture and reforming the respective acids by acidifying the barium salts.

The following example illustrates the embodiment of the process of this invention illustrated by FIG. 2 wherein the separations are carried out as a continuous process.

*Example 2*

A mixture of isomeric phthalic acids obtained by the catalytic liquid phase oxidation of a commercial xylene containing a high proportion of o-xylene with air is continuously withdrawn from reactors and charged through conduits 8 to surge tank such as feed tank 10 where the effluents from two or more reactors are combined. Pressure is reduced by valved conduit 9 and the composite mixture is cooled to 235° F. On an hourly basis to crystallization tank 14 there is charged 17,027 pounds of the mixture containing: 5,900 pounds acetic acid, 1,324 pounds water, 4,135 pounds ortho-phthalic acid, 2,727 pounds iso-phthalic acid, 1,163 pounds terephthalic acid, 963 pounds benzoic acid, 276 pounds of toluic acid with the remaining 539 pounds being catalyst, unoxidized hydrocarbons and intermediate oxidation products. To this mixture there is added on an hourly basis 500 pounds of recycled recovered wet acetic acid (25% water by weight) and 10,366 pounds of mother liquor from separator 25 through line 26. The resulting mixture is concentrated and cooled to 140° F. at 110 mm. Hg while removing through conduit 20 on an hourly basis 2,564 pounds of an acetic acid condensate containing 1,930 pounds acetic acid, 620 pounds water and 14 pounds hydrocarbon. The resulting mixture at 140° F. is fed continuously to separator 25, a continuous centrifugal filter, from which there is withdrawn through line 41 on an hourly basis 8,798 pounds of a wet mixed phthalic acid cake and through conduit 26 15,831 pounds of mother liquor. The wet cake is dried in drier 65 at 300° F. and the wet acetic acid vapors from line 62 are collected for recovery of acetic acid.

The mother liquor from separator 25 less the amount recycled to the crystallization step by conduit 27 is charged through valved conduit 34 to still 33 for recovery of wet acetic acid, benzoic acid and phthalic acid. From 5,465 pounds per hour of the mother liquor there is stripped off 3,872 pounds wet acetic acid (about 17% water). The still bottoms 1,592 pounds per hour withdrawn through conduit 40 containing 2.0 pounds acetic acid, 1.0 pound water, 271 pounds phthalic anhydride, 11 pounds isophthalic acid, 1.0 pound terephthalic acid, 713 pounds benzoic acid, 204 pounds toluic acid with the remaining 389 pounds containing catalyst, hydrocarbon and intermediate oxidation products are combined with 430 pounds of a recycle stream from phthalic anhydride purification from conduit 56 containing 338 pounds phthalic anhydride, 84 pounds isophthalic acid and 8.0 pounds terephthalic acid and charged to fractionation column 50. From fractionation column 50 there is recovered from the composite 820 pounds per hour of benzoic acid fraction containing 111 pounds toluic acid, 656 pounds benzoic acid and 53 pounds phthalic anhydride. A fraction, 623 pounds per hour, containing 486 pounds phthalic anhydride, 50 pounds of benzoic acid and 87 pounds of toluic acid is recycled to the surge tank 10; a vapor fraction of 20 pounds per hour containing 7.0 pounds phthalic anhydride, 7.0 pounds benzoic acid and 6.0 pounds of toluic acid is taken to a scrubber; and 530 pounds per hour of bottoms containing 63 pounds phthalic anhydride, 95 pounds isophthalic acid, 9.0 pounds terephthalic acid with the remaining 363 pounds being intermediate oxidation products and catalyst.

The mixture of phthalic acids dried at 300° F., 7,444 pounds per hour, containing 16 pounds acetic acid, 1.0 pound water, 3,581 pounds o-phthalic acid, 2,676 pounds isophthalic acid, 1,149 pounds of terephthalic acid, 11 pounds benzoic acid, 8.0 pounds intermediate oxidation products and 2.0 pounds catalyst are charged through line 66 to reslurry tank 42 with 37,946 pounds per hour of an aqueous stream charged through valved conduit 43. The aqueous stream being obtained by combining water wash from separator 47 and an aqueous stream from conduit 96 obtained from the crystallization of o-phthalic acid from mother liquor from conduit 48. The aqueous stream charged through conduit 43 contains 300 pounds acetic acid, 36,033 pounds water, 1,126 pounds o-phthalic acid, 43 pounds isophthalic acid, 8.0 pounds terephthalic acid, 281 pounds benzoic acid, 125 pounds intermediate oxidation products and 30 pounds of catalyst. The resulting slurry is heated to 149° F., pumped to dissolver 72 where it is further heated to 205° F. and filtered hot in separator 47. The mother liquor going to crystallizer 80 and the recovered wet solids after being washed with water is removed through conduit 49. There is obtained as wet solid 5,010 pounds per hour containing 10 pounds acetic acid, 1,235 pounds water, 19 pounds o-phthalic acid, 2,598 pounds isophthalic acid, 1,142 pounds terephthalic acid, 4.0 pounds benzoic acid and 2.0 pounds intermediate oxidation product. Water is added through line 75 to wash the wet cake removing orthophthalic acid, benzoic acid, oxidation intermediates, catalyst, and a small amount of isophthalic acid and terephthalic acid (about 4 pounds total of the latter two isomers). This wet solid product can be readily separated into an isophthalic acid product and a terephthalic acid product by leaching with water or acetic acid, the undissolved solid being a terephthalic acid product of at least 98% purity. An isophthalic acid product of at least 85 to 90% purity can be recovered from the solution thereof.

The mother liquor removed to crystallizer 80 is cooled and concentrated at 140° F. and about 150 mm. Hg with about 70% of the vapors flashed off being condensed and returned to the crystallizer and the remainder drawn off through conduit 84. Also added to the crystallizer through conduit 85 are the recycle aqueous stream from the dehydration of the ortho acid to phthalic anhydride and anhydride distillation. From the crystallizer on an hourly basis there is charged through conduit 86 to separator 87 for the recovery of crystallized orthophthalic acid 39,852 pounds of slurry from which 4,934 pounds of wet ortho acid product is recovered. Most of the mother liquor is recycled by conduit 96 to reslurry tank 42 with about 4% being discarded through conduit 88. The wet ortho acid crystalline product is dehydrated in still 91 to crude phthalic anhydride and the crude anhydride distilled to give 2,800 pounds per hour of substantially pure phthalic anhydride.

What is claimed is:

1. A process for the recovery of benzene carboxylic acids from a mixture containing the three isomeric phthalic acids, benzoic acid and acetic acid obtained at a temperature above 140° F. up to 525° F. by the liquid phase oxidation with molecular oxygen of mixed xylenes containing monoalkylbenzene in the presence of acetic acid and a catalyst consisting essentially of bromine and a metal oxidation catalyst wherein acetic acid is present in said mixture in an amount of from 30 to 50 parts per 100 parts total mixture by weight and wherein substantially all of the isophthalic acid is in solution, comprising crystallizing from said reaction mixture a solid gross phthalic acid product containing substantially all the terephthalic and isophthalic acids and from 70 to 80% of the orthophthalic acid at a temperature of from 130 to 150° F., separately recovering solid gross phthalic acid product and as a first mother liquor the acetic acid solution, selectively dissolving orthophthalic acid from said gross phthalic acid product with from 1.5 to 5 parts water per part of gross phthalic acid product by weight at a temperature of from 200° to 210° F. leaving a second solid phthalic acid product containing terephthalic acid and isophthalic acid, selectively dissolving isophthalic acid from said second phthalic acid product with water at a temperature above 210° F. and at a pressure to maintain water in the liquid phase leaving undissolved terephthalic acid, separating said undissolved terephthalic acid from the aqueous solution of isophthalic acid, recovering an isophthalic acid product from the aqueous solution thereof, recovering orthophthalic acid by crystallization from the aqueous solution thereof, separately recovering from the first mother liquor acetic acid and a benzoic acid product.

2. The process of claim 1 wherein the water employed to dissolve the orthophthalic acid from the gross phthalic acid is the aqueous mother liquor from the recovery of the ortho acid by crystallization.

3. The process of claim 1 wherein the solid gross phthalic acid product is obtained by removal of a portion of the acetic acid from the oxidation reaction mixture and cooling the concentrate.

4. The process of claim 1 wherein acetic acid and a benzoic acid product are recovered by heating the first mother liquor under distillation conditions to distill off acetic acid and a benzoic acid product.

5. The process of claim 1 wherein the acetic acid, benzoic acid and orthophthalic acid are recovered by crystallizing an orthophthalic acid product from the first mother liquor, separating the solid orthophthalic acid from the remaining liquid, and distilling the remaining liqud to recover acetc acid and benzoic acid.

6. The process comprising providing a mixture containing isomeric phthalic acids and an acetic acid solvent wherein said mixture has been heated to a temperature in the range of above 140 up to 350° F. to dissolve a major portion of the isophthalic acid and wherein acetic acid is present in an amount of from above 50 to 500 parts per 100 parts of total mixture by weight, concentrating said mixture to a composition containing acetic acid in the range of from 30 to 50 parts per 100 parts total mixture by weight, cooling the resulting concentrated composition to a temperature in the range of from 120 to 160° F. thereby crystallizing a gross phthalic acid product containing 25 to 80% of orthophthalic acid originally present in the isomeric phthalic acids, separating the crystallized gross phthalic acid product from the mother liquor acetic acid solution, contacting the crystallized gross phthalic acid product with water in an amount of from 1.5 to 5 parts per part of gross phthalic acid product by weight at a temperature in the range of 200 to 210° F. to selectively dissolve orthophthalic acid leaving a second solid phthalic acid product, separating said aqueous solution of orthophthalic acid from said second solid phthalic acid product, recovering phthalic acid as its anhydride from said aqueous solution, separating said second solid phthalic acid product into an isophthalic acid product and a terephthalic acid product by contacting said second phthalic acid product with water at elevated temperature above 210° F. and at a pressure to maintain water in the liquid phase whereby substantially all of the isophthalic acid is dissolved in the water at said elevated temperature and pressure, separating the undissolved terephthalic acid from the aqueous solution of isophthalic acid, crystallizing an isophthalic acid product from said aqueous solution thereof and recovering orthophthalic acid and acetic acid from the motor liquor acetic acid solution.

7. The process of claim 6 wherein the concentrating and cooling of the mixture containing isomeric phthalic acids and acetic acid is accomplished by evaporative cooling at subatmospheric pressure.

References Cited in the file of this patent

UNITED STATES PATENTS

| | | |
|---|---|---|
| 2,734,914 | McKinnis | Feb. 14, 1956 |
| 2,820,819 | Aroyan | Jan. 21, 1958 |
| 2,833,816 | Saffer et al. | May 6, 1958 |
| 2,840,604 | Feighner et al. | June 24, 1958 |
| 2,905,708 | Petersen et al. | Sept. 22, 1959 |

OTHER REFERENCES

Seidell: Solubilities of Organic Compounds, vol. 2, pages 572-3 (1941).

UNITED STATES PATENT OFFICE
CERTIFICATE OF CORRECTION

Patent No. 3,082,250 March 19, 1963

Richard H. Baldwin et al.

It is hereby certified that error appears in the above numbered patent requiring correction and that the said Letters Patent should read as corrected below.

Column 2, line 7, strike out "of"; column 10, line 44, for "motor" read -- mother --.

Signed and sealed this 8th day of October 1963.

(SEAL)
Attest:

ERNEST W. SWIDER
Attesting Officer

EDWIN L. REYNOLDS
Acting Commissioner of Patents